United States Patent
Huck et al.

(10) Patent No.: US 10,756,566 B2
(45) Date of Patent: Aug. 25, 2020

(54) METHOD AND APPARATUS FOR SUPPLYING ELECTRIC POWER TO A DEVICE

(71) Applicant: Robert Bosch GmbH, Stuttgart (DE)

(72) Inventors: Thorsten Huck, Murr (DE); Tuelin Baysal, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 74 days.

(21) Appl. No.: 16/082,727

(22) PCT Filed: Mar. 6, 2017

(86) PCT No.: PCT/EP2017/055157
§ 371 (c)(1),
(2) Date: Oct. 31, 2018

(87) PCT Pub. No.: WO2017/153318
PCT Pub. Date: Sep. 14, 2017

(65) Prior Publication Data
US 2019/0074714 A1 Mar. 7, 2019

(30) Foreign Application Priority Data
Mar. 10, 2016 (DE) .................. 10 2016 203 974

(51) Int. Cl.
*H02J 9/06* (2006.01)
(52) U.S. Cl.
CPC ............... *H02J 9/061* (2013.01); *H02J 9/06* (2013.01)

(58) Field of Classification Search
CPC .................................. H02J 9/061; H02J 9/06
See application file for complete search history.

(56) References Cited

U.S. PATENT DOCUMENTS 6,297,640 B1 * 10/2001 Hayes .................. H01H 47/226
324/415

FOREIGN PATENT DOCUMENTS

| DE | 10148348 A1 | 4/2003 |
| DE | 102012210078 A1 | 12/2013 |
| DE | 102013221577 A1 | 4/2015 |
| JP | 2008005662 A | 1/2008 |
| JP | 2010120624 A | 6/2010 |
| JP | 2014036556 A | 2/2014 |
| WO | 2015165626 A1 | 11/2015 |

OTHER PUBLICATIONS

International Search Report dated Jun. 14, 2017 of the corresponding International Application PCT/EP2017/055157 filed Mar. 6, 2017.

* cited by examiner

*Primary Examiner* — Robert L Deberadinis
(74) *Attorney, Agent, or Firm* — Norton Rose Fulbright US LLP; Gerard Messina

(57) ABSTRACT

A method for supplying electrical power to a device, including: supplying power to the device from a first electrical power supply unit via a switch mechanism in a particular (or preferred) position; and supplying power to the device from a second electrical power supply unit through a defined switching over of the switch mechanism to a secondary position.

15 Claims, 5 Drawing Sheets

METHOD AND APPARATUS FOR SUPPLYING ELECTRIC POWER TO A DEVICE

FIELD OF THE INVENTION

The present invention relates to a method for supplying a device with electrical power. The present invention also relates to an apparatus for supplying a device with electrical power.

BACKGROUND INFORMATION

In the existing art, environmental sensor systems (radar, video, lidar, etc.) for producing a highly available environmental model for highly automated and fully automated driving functions are supplied with electrical power via a singular, or individual, connection. In addition, in the existing art only one power supply unit is present in the vehicle, or, if a plurality of power sources/producers are present, these are galvanically coupled and are not independent in the system network. If there is a failure of the electrical power supply or power source, one or more sensors of the environmental sensor system will then no longer be available. In order to ensure a remaining degree of functionality, the sensor set (i.e. the totality of all the sensors installed in the vehicle) is divided into two subsets and connected to independent power sources. When one power supply fails, the system therefore still has available a subset of sensor information with which a driving maneuver can be carried out according to a defined driving strategy, as long as the driver does not take over.

SUMMARY OF THE INVENTION

An object of the present invention is to provide an improved method and an improved apparatus for supplying electrical power for a device.

According to a first aspect, the object is achieved by a method for supplying electrical power for a device having the steps:
  supplying power to the device from a first electrical power supply unit via a switch mechanism in a preferred position; and
  supplying power to the device from a second power supply unit that is independent of the first electrical power supply unit, through a defined switching over of the switch mechanism to a secondary position.

According to a second aspect, the object is achieved by an apparatus for supplying electrical power to a device, having:
  at least two electrical power supply units;
  at least one switch mechanism having a preferred position and a secondary position, the preferred position and the secondary position being connected respectively to one of the electrical power supply units; and
  a control device;
  the device being capable of being supplied with electrical power in a defined fashion from each of the electrical power supply units, and a switching over of the switch mechanism being capable of being controlled by the control device.

Advantageously, in this way it is possible to connect a device that is to be supplied with electrical power to a second power supply unit in an unmodified manner using a switch mechanism. Advantageously, in this way no modification to existing elements of the device need be made. An increased degree of availability of the electrical power supply for the device can easily be realized in this way.

Advantageous developments of the method and of the apparatus are the subject matter of the descriptions herein.

An advantageous development of the method provides that the switching over of the switch device between the preferred position and the secondary position is carried out when there is a malfunction in one of the electrical power supply units. In this way, a reliable operation of the device is supported, and redundancy is realized in particular in case of a fault in one of the power supply units.

A further advantageous development of the method provides that, in an initialization phase of the device, the switch mechanism is checked for the proper functioning of a connection between a terminal of the power supply unit and an output, and between a terminal of the power supply unit and the output. In this way, the proper functioning of the switch mechanism can advantageously be checked at regular time intervals.

A further advantageous development of the method provides that during running operation of the device, the switch mechanism is switched over between the preferred position and the secondary position in a defined manner. In this way, a checking of the proper functioning of the switch mechanism is advantageously possible even during running operation of the device.

A further advantageous development of the method provides that the device has a defined number of components, a defined number of the components being connected respectively to a switch mechanism, and the switch mechanisms being switched over in a defined fashion between a preferred position and a secondary position. In this way, a supply of electrical power for a device having a plurality of components can be realized redundantly.

An advantageous development of the apparatus provides that the device has a defined number of components, each component being connected respectively to a switch mechanism. In this way, a high degree of redundancy is enabled, so that when there is a failure of a component of the device a defined degree of functionality continues to be provided.

Another advantageous development of the apparatus is distinguished in that the apparatus has two electrical power supply units. In this way, a useful case for practical application is realized that provides a supply of electrical power of the apparatus via two independent electrical power supply units.

Another advantageous development of the apparatus is characterized in that a device for a highly automated driving operation of a motor vehicle can be supplied with electrical power by the apparatus. In this way, a useful case of application of the apparatus is provided, because a very high degree of redundancy is required for such a device.

Another advantageous development of the apparatus is characterized in that the device has at least one component of a sensor device for acquiring a surrounding environment of the motor vehicle. In this way, a high degree of redundancy with regard to the supply of electrical power is provided for a sensor system, for example in the form of radar, video, lidar.

Another advantageous development of the apparatus is characterized in that the switch mechanism is a semiconductor switch, in particular a power semiconductor switch. In this way, a simple technical realization is supported that advantageously supports an absence of feedback influence between the two electrical power supply units.

Another advantageous development of the apparatus provides that the electrical power supply units cannot be short-circuited via the switch mechanism. In this way, a fault case is excluded in which a mutual influencing of the two electrical power supply units occurs.

The safety against short-circuiting of the power supply units can be realized in principle via two diodes. A short circuit to ground at the output of a power supply unit would have a feedback influence on its inputs and could short-circuit the onboard networks (input) to ground. This is remedied by field-effect transistors (FET) connected back-to-back. In the case of power supply units having two inputs, this would then result in a total of four field-effect transistors per unit.

Another advantageous development of the apparatus is characterized in that the switch mechanism is integrated into the device or is made separately from the device. In this way, a large number of possible designs for the apparatus are supported.

In the following, the present invention, with further features and advantages, is described in detail on the basis of a plurality of figures. The figures are to be understood primarily as illustrating the essential principle of the present invention. Identical or functionally identical elements have been provided with identical reference characters.

Disclosed apparatus features result analogously from corresponding disclosed method features, and vice versa. This means in particular that features, technical advantages, and embodiments relating to the method for supplying electrical power to a device result in an analogous fashion from corresponding embodiments, features, and advantages relating to the apparatus for supplying electrical power to a device, and vice versa.

DETAILED DESCRIPTION

Figure 1:
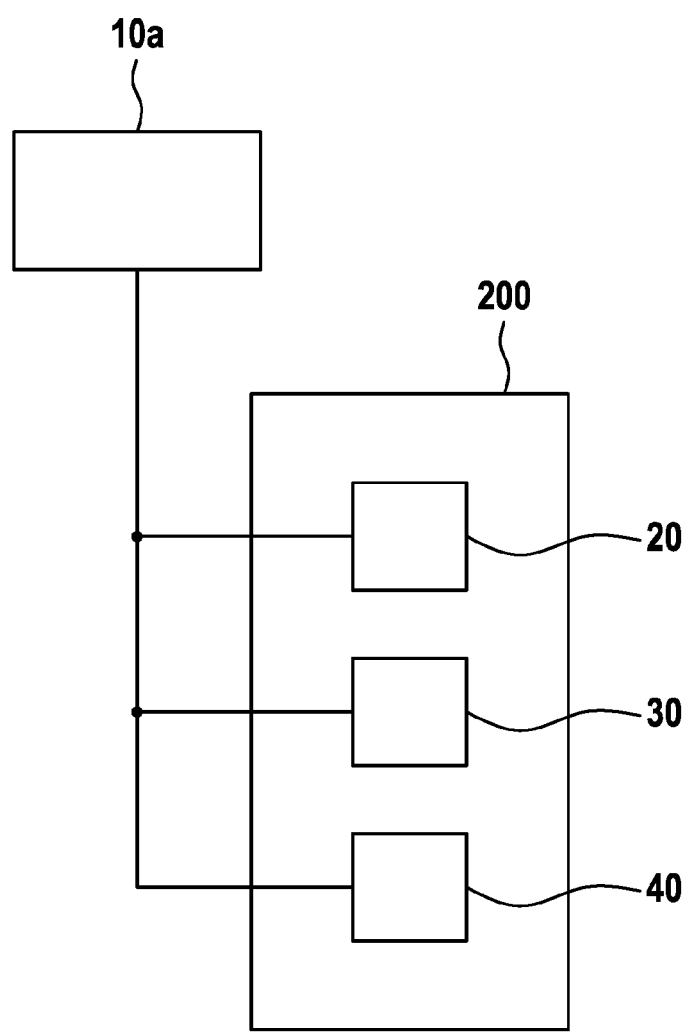
FIG. 1 shows a conventional apparatus for supplying electrical power to a device.

FIG. 1 shows a conventional apparatus for supplying electrical power for a device. Visible is an electrical power supply device 10*a*, for example in the form of an electrical on-board network of a motor vehicle, the on-board network including, inter alia, a battery or accumulator, a starter, and a generator. Electrical power supply device 10*a* supplies power to a plurality of components 20, 30, and 40, realized for example as components for highly automated driving of the motor vehicle, for example in the form of a radar sensor and/or a lidar sensor and/or a video sensor, etc. In the case of failure of electrical power supply unit 10*a*, or of the on-board electrical network of the motor vehicle, there is no redundancy with regard to the supply of electrical power, so that severe limitations of the automated driving functionality of the motor vehicle may result.

Figure 2:
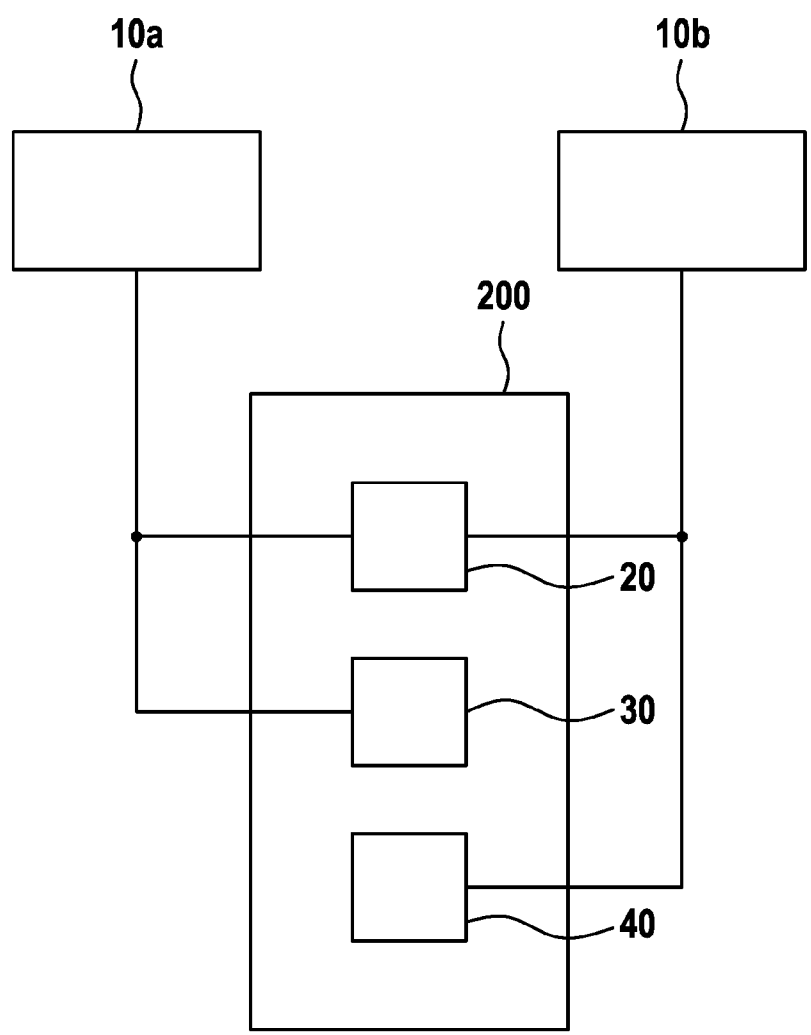
FIG. 2 shows another conventional apparatus for supplying electrical power to a device.

As a remedy of the described situation, FIG. 2 shows a conventional realization of redundancy; in this case, two mutually independent electrical power supply units 10*a*, 10*b* are provided that are connected in a specific way to components 20, 30, 40 of device 200. Component 20, realized for example as an actuator, for example in the form of EPS (electronic power steering), and components 30, 40, realized as environmental sensors, are connected either to first power supply unit 10*a* or to second power supply unit 10*b*. It will be seen that component 20 is connected to both power supply units 10*a*, 10*b*, component 30 being connected only to first electrical power supply unit 10*a* and component 40 being connected only to second electrical power supply unit 10*b*.

In this way, a certain degree of redundancy is realized with regard to the supply of electrical power to components 20, 30, 40; however, high losses of functionality must also be accepted here in some circumstances if one of the two electrical power supply units 10*a*, 10*b* is defective or fails.

The present invention proposes to provide redundancy to an electrical power supply for a device by increasing a degree of availability of the supplied device when there is a failure of an electrical power supply unit.

In this way, for example a highly available supply of electrical power to environmental sensors can be realized for highly and/or fully automated driving functions of the motor vehicle. The design according to the present invention can however advantageously also be applied to other components or devices.

In this way, an increase of safety in road traffic can be achieved when there is a failure of a power supply unit. The information about the surrounding environment of the vehicle that remains when a supply fails can in this way be significantly improved or increased. In this way, the highly or fully automated function undergoes a lower degree of degradation when an error occurs, and occupant safety is thus increased. For example, in this way the availability of the sensors having field of view front can be increased in order to continue to reliably avoid front collisions after a failure of an electrical power supply until the driver again has secure control of the vehicle. In addition, in this way a high degree of availability of automated driving functions of a highly or fully automated vehicle is improved.

In order to improve the quality of the environmental model when there is a failure of a power supply unit, the sensors are supplied with power either via first electrical power supply unit 10*a* or via second electrical power supply unit 10*b*. The changeover between the two electrical power supply units 10*a*, 10*b* is done here via semiconductor switches that may be realized in semiconductor technology, which may be FETs.

The tasks of the switch mechanism are:
- to provide a power supply redundancy, thereby supporting a highly available provision of the electrical power supply required for the component
- to provide a fault recognition and a display (self-diagnosis and recognition)
- fault isolation (fault recognition of the component supplied with power, in order to prevent feedback effects on other connected components as far as possible).

Figure 3:
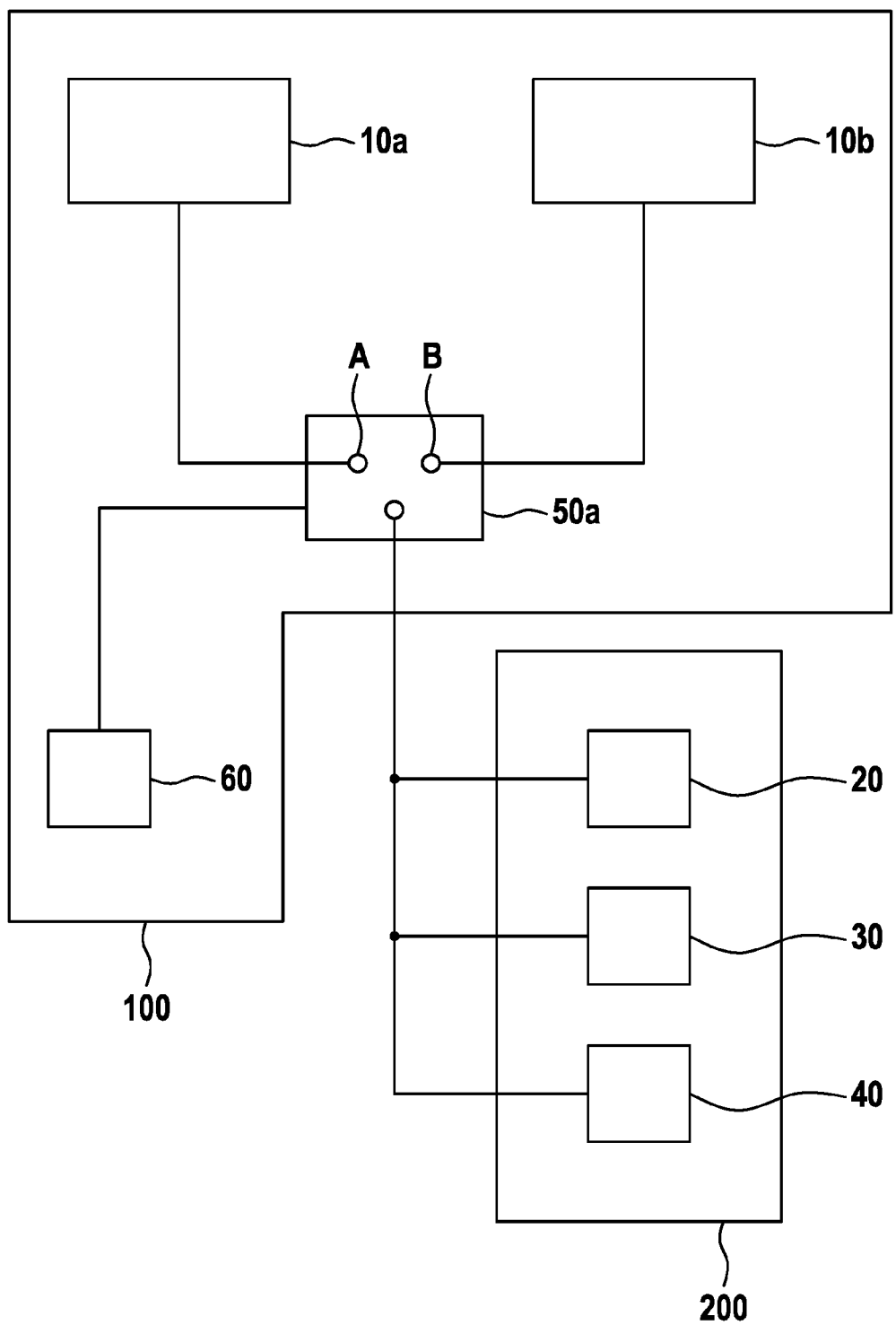
FIG. 3 shows a first specific embodiment of an apparatus for supplying electrical power to a device.

FIG. 3 shows a first specific embodiment of such an apparatus 100. It will be seen that apparatus 100 has a first electrical power supply unit 10*a* and a second electrical power supply unit 10*b*, both power supply units 10*a*, 10*b* being connected to a switch mechanism 50. Switch mechanism 50*a* has a preferred position A; in this case, switch mechanism 50*a* is connected to first electrical power supply unit 10*a*. In addition, switch mechanism 50*a* has a secondary position B in which switch mechanism 50*a* is connected to second electrical power supply unit 10b. In this way, switch mechanism 50 supplies a device 200 having components 20, 30, and 40 with electrical power, either from first electrical power supply unit 10a or from second electrical power supply unit 10b, depending on the position of switch mechanism 50a.

It is also possible to switch components 20, 30, and 40 completely "powerless," so that in a further switch position both power supply units 10a, 10b are completely separated. This is appropriate in particular in order to separate or isolate comfort-related power consumers in case of error, but also to optimize sub-network operation, for example for charging an electric vehicle. In addition, apparatus 100 includes a control device 60 that acquires a state of the two electrical power supply units 10a, 10b, and, in reaction thereto, emits signals for switching to switch mechanism 50a. The named control device 60, which represents a "switch intelligence," may be realized as software situated inside switch mechanism 50a, or can also be situated externally thereto, as shown in FIG. 3. If a plurality of switch mechanisms 50a are installed in the vehicle, then communication is provided between a plurality of corresponding control devices 60. In a particular embodiment, control device 60 can however also be combined in a central unit.

In a respective initialization phase of device 200, switch mechanism 50a is checked for the proper functioning of the connection between preferred position A, or terminal A, and an output of switch mechanism 50a, and of a connection between secondary position B, or terminal B, and the output of switch mechanism 50a.

If a fault is recognized in first electrical power supply unit 10a, then switch mechanism 50 switches from preferred position A to secondary position B, so that components 20, 30, and 40 are now supplied with electrical power by second electrical power supply unit 10b. In this way, redundancy in the supply of electrical power is supported for device 200, and the overall system can continue to be operated in essentially unmodified fashion, with full functionality, even when there is a failure of one of the power supply units 10a, 10b or on-board networks of the motor vehicle. After this, only the connection between apparatus 100 and device 200 is a so-called "common cause"; i.e. a failure of the connection also results in the failure of all connected components 20, 30, and 40. In order to mitigate this fault, which may be a plurality of switch mechanisms 50a . . . 50c are installed in the vehicle, as is described below with reference to FIG. 4.

Switch mechanism 50a may be configured in such a way that there is no fault that causes a short-circuit of the two electrical power supply units 10a and 10b. In this way, a high degree of security against failure of the overall apparatus 100 is supported. For this purpose, switch mechanism 50 realizes an absence of feedback influence in the case of a fault (for example in component 20), so that the availability of the other components 30, 40 is not influenced in this way.

Advantageously, apparatus 100 includes a diagnostic functionality so that it can itself check for possible defects, such as a defective switch mechanism 50a . . . 50c, in order to indicate this to control device 60.

A changeover between the preferred position and the secondary position does not necessarily have to take place. Apparatus 100 may contain more than one switch mechanism 50a, at least two switch mechanisms 50a being realized in the form of semiconductor switches. A respective switch mechanism 50a is closed in order to ensure the supply of electrical power to device 200. During this, the other switch mechanism 50a . . . 50c or the other supply channel can be tested. In addition, for polarity protection at least three, in particular four semiconductor switches can be provided whose testing is ensured.

Advantageously, it can be provided that a fault state of one of the electrical power supply units 10a, 10b in switch mechanism 50a can be made known to a user, e.g. optically and/or acoustically, or can also be made known to the higher-order system, after which, for the example of an automated driving function, this function is no longer "offered" to the driver, or is deactivated, whereby corresponding system adaptations relating to power supply units 10a, 10b can be initiated or carried out.

Figure 4:
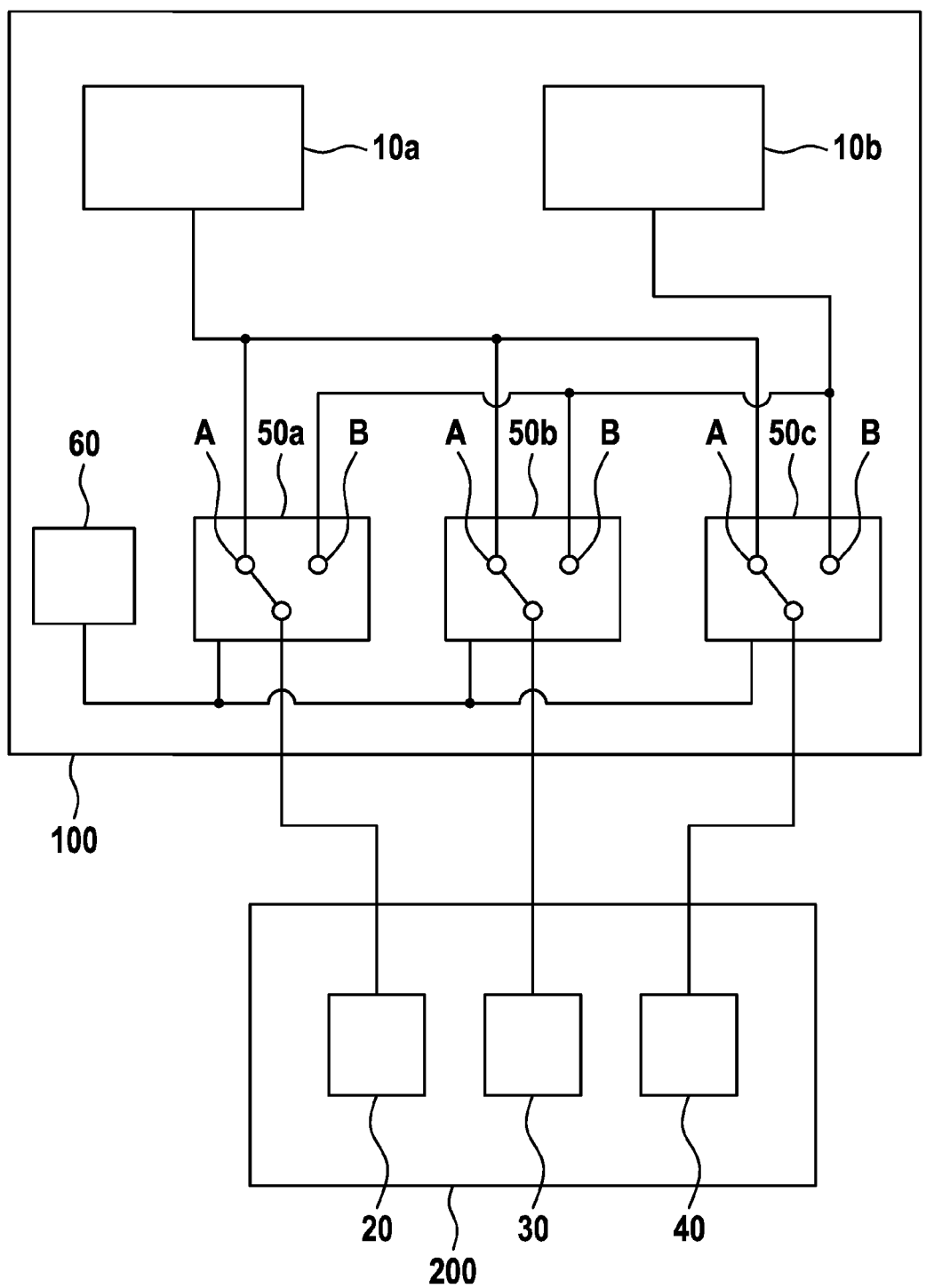
FIG. 4 shows another specific embodiment of an apparatus for supplying electrical power to a device.

FIG. 4 shows a further specific embodiment of an apparatus 100 for supplying electrical power to a device 200. In this case, all components 20, 30, and 40 can optionally be supplied with electrical power either via first electrical power supply units 10a or via second electrical power supply unit 10b, because each of the components 20, 30, 40 is connected to a respective switch mechanism 50a . . . 50c. For example, a fault in the supply line between switch mechanism 50a and component 20 causes only a failure of component 20, and the remaining components 30, 40 advantageously remain uninfluenced by this fault.

In this way, as a result a still higher availability of system performance is supported, and a greater degree of safety against failure is provided.

It will be recognized that the two variants of FIG. 3 and FIG. 4 represent, in a sense, "extreme cases"; in the case of FIG. 3, a single switch mechanism 50a is used, and in the variant of FIG. 4 each component 20, 30, 40 of device 200 is connected to a separate switch mechanism 50a . . . 50c. Mixed forms (not shown in the Figures) are also conceivable, in which particularly critical components 20, 30, 40 are each connected to a separate switch mechanism 50a . . . 50c.

Also conceivable are various possibilities of an integration of switch mechanisms 50a . . . 50c into apparatus 100. One possibility is an expansion of decentralized power supply units (power distribution units), which could replace an electrical fuse box in the motor vehicle. In addition, an integration of switch mechanism 50a into control device 60 (for example the fuse box or central control devices (not shown)) is possible, where the control device is provided with two electrical power supply units 10a, 10b, and in this way components 20, 30, 40, which in particular are realized as environmental sensors of the motor vehicle, are supplied with electrical power.

Also conceivable is an integration of switch mechanism 50a into the respective components 20, 30, 40 of device 200. In order to avoid so-called "common cause faults," i.e. faults due to a common cause that can have effects up to total failure, this solution would require a further plug for connecting the second power supply to all, or to individual, "critical" components 20, 30, 40, requiring a somewhat larger constructive design of components 20, 30, 40.

Advantageously, it is also possible to provide more than two electrical power supply units 10a, 10b for the proposed design; in this case, the number of switch mechanisms 50a . . . 50c has to be correspondingly adapted to the number of electrical power supply units 10a, 10b.

Figure 5:
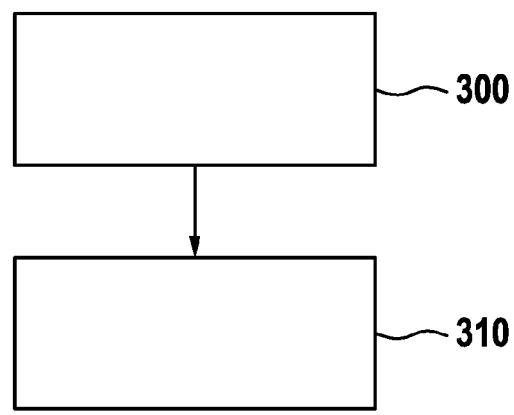
FIG. 5 shows a schematic sequence of a specific embodiment of the method according to the present invention.

FIG. 5 schematically shows a flow diagram of a specific embodiment of the method for supplying electrical power to a device.

In a step 300, device 200 is supplied with power from a first electrical power supply unit 10a, via a switch mechanism 50a in a preferred position A.

In a step 310, device 200 is supplied with power from a second electrical power supply unit 10b through a defined switching of switch mechanism 50a to a secondary position B.

Figure 6:
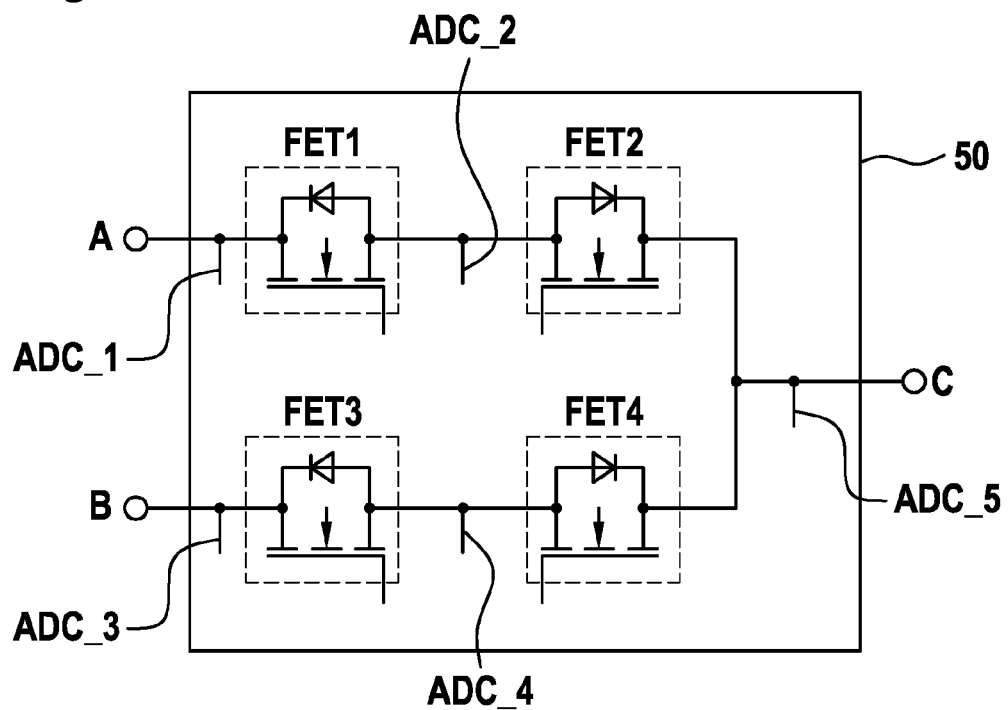
FIG. 6 shows a circuit diagram of a specific embodiment of a switch mechanism of the apparatus for supplying electrical power to a device.

FIG. 6 shows a schematic diagram of a specific embodiment of a switch mechanism 50 of apparatus 100 for supplying electrical power to a device according to the present invention. The depicted switch mechanism 50 has two inputs A and B and an output C. Inputs A and B are each set up in order to be connected to an electrical power supply unit. Depending on the position of the switch mechanism, i.e. depending on whether switch mechanism 50 is set to the preferred position or to the secondary position, switch mechanism 50 supplies, at output C, electrical power from the electrical power unit that is connected to input A or to input B.

In the present context, the preferred position is understood as meaning that switch mechanism 50 is connected in such a way that the power supply unit connected to input A comes into effect. Correspondingly, in the present context, the secondary position is understood as meaning that switch mechanism 50 is connected in such a way that the power supply unit connected to input B comes into effect.

It will be clear to the person skilled in the art that this holds for the depicted specific embodiment. It is just as much the case that the preferred position could cause the power supply unit connected to input B to come into effect, and correspondingly the secondary positions could cause the power supply unit connected to input A to come into effect.

In addition, FIG. 6 shows that this specific embodiment of switch mechanism 50 has four field-effect transistors FET1 through FET4. Two FETs are provided per input A and B, wired in back-to-back fashion as shown.

This connection of the FET pairs has the consequence that the power supply units connected to inputs A and B cannot be short-circuited.

Thus, a short circuit to ground, which in some circumstances could have negative effects on the entire on-board network accessible via inputs A and B, can effectively be prevented.

Not shown in FIG. 6, but nonetheless forming a part of switch mechanism 50, are a control and monitoring device, for example a microcontroller or an application-specific integrated circuit (ASIC), or the like, for controlling or monitoring and for carrying out the switching processes. Also not shown are the voltage supply of the device, the charge pump for controlling field-effect transistors FET1 through FET4, communication interfaces, and protective diodes and, if required, capacitors.

Internal terminals ADC_1 through ADC_5 are terminals to analog-digital converters of the control and monitoring device, or of the microcontroller, or of the ASIC or the like, plus, in addition, corresponding pre-resistors or voltage dividers.

In sum, the present invention proposes an improved method for supplying electrical power to a device, with which a high degree of redundancy is supported within the functional scope of the device. Operational safety of the device is advantageously increased in this way.

Although the present invention has been described above on the basis of concrete specific embodiments, it is in no way limited thereto. A person skilled in the art will recognize that numerous modifications, not disclosed or only partly disclosed, of the present invention are possible without departing from the core of the present invention.

What is claimed is:

1. A method for supplying electrical power to a device via an apparatus, the method comprising:
   supplying power to the device from a first electrical power supply unit of at least two electrical power supply units of the apparatus via at least one switch mechanism in a preferred position, wherein the at least one switch mechanism has the preferred position and a secondary position; and
   supplying power to the device from a second electrical power supply unit of the apparatus through a defined switching over of the switch mechanism to a secondary position, wherein the preferred position and the secondary position are connected respectively to one of the electrical power supply units;
   wherein the device is suppliable with electrical power in a defined manner from each of the electrical power supply units via the switch mechanism, and wherein a switching over of the switch mechanism is controllable by a control device of the apparatus, and
   wherein via the apparatus, the device is suppliable with electrical power for an automated driving operation of a motor vehicle.

2. The method of claim 1, wherein the switching over of the switch mechanism between the preferred position and the secondary position is performed when there is a malfunction in one of the electrical power supply units.

3. The method of claim 1, wherein in an initialization phase of the device, the switch mechanism is checked for the proper functioning of a connection between a terminal of the power supply unit and an output of the switch mechanism, and between a terminal of the power supply unit and the output.

4. The method of claim 1, wherein the switch mechanism is switched over in a defined manner between the preferred position and the secondary position during running operation of the device.

5. The method of claim 1, wherein the device has a defined number of components, wherein the defined number of the components are connected to a respective switch mechanism, and wherein the switch mechanisms are switchable over in a defined manner between a preferred position and a secondary position.

6. An apparatus for supplying electrical power to a device, comprising:
   at least two electrical power supply units;
   at least one switch mechanism having a preferred position and a secondary position, wherein the preferred position and the secondary position are connected respectively to one of the electrical power supply units; and
   a control device;
   wherein the device is suppliable with electrical power in a defined manner from each of the electrical power supply units via the switch mechanism, and wherein a switching over of the switch mechanism is controllable by the control device, and
   wherein via the apparatus, the device is suppliable with electrical power for an automated driving operation of a motor vehicle.

7. The apparatus of claim 6, wherein the device has a defined number of components, and wherein each of the components is connected to a respective switch mechanism.

8. The apparatus of claim 6, wherein the apparatus has two electrical power supply units.

9. The apparatus of claim 6, wherein the device has at least one sensor device for acquiring a surrounding environment of the motor vehicle.

10. An apparatus for supplying electrical power to a device, comprising:
- at least two electrical power supply units;
- at least one switch mechanism having a preferred position and a secondary position, wherein the preferred position and the secondary position are connected respectively to one of the electrical power supply units; and
- a control device;
- wherein the device is suppliable with electrical power in a defined manner from each of the electrical power supply units via the switch mechanism, and wherein a switching over of the switch mechanism is controllable by the control device, and
- wherein the electrical power supply units cannot be short-circuited via the switch mechanism.

11. The apparatus of claim 10, wherein the switch mechanism is integrated into the device.

12. The apparatus of claim 10, wherein the switch mechanism is separate from the device.

13. An apparatus for supplying electrical power to a device, comprising:
- at least two electrical power supply units;
- at least one switch mechanism having a preferred position and a secondary position, wherein the preferred position and the secondary position are connected respectively to one of the electrical power supply units; and
- a control device;
- wherein the device is suppliable with electrical power in a defined manner from each of the electrical power supply units via the switch mechanism, and wherein a switching over of the switch mechanism is controllable by the control device, and
- wherein the switch mechanism includes a semiconductor switch.

14. A non-transitory computer readable medium having a computer program, which is executable by a processor, comprising:
- a program code arrangement having program code for supplying electrical power to a device via an apparatus, by performing the following:
  - supplying power to the device from a first electrical power supply unit of at least two electrical power supply units of the apparatus via at least one switch mechanism in a preferred position, wherein the at least one switch mechanism has the preferred position and a secondary position; and
  - supplying power to the device from a second electrical power supply unit of the apparatus through a defined switching over of the switch mechanism to a secondary position, wherein the preferred position and the secondary position are connected respectively to one of the electrical power supply units;
- wherein the device is suppliable with electrical power in a defined manner from each of the electrical power supply units via the switch mechanism, and wherein a switching over of the switch mechanism is controllable by a control device of the apparatus, and
- wherein via the apparatus, the device is suppliable with electrical power for an automated driving operation of a motor vehicle.

15. An apparatus for supplying electrical power to a device, comprising:
- at least two electrical power supply units;
- at least one switch mechanism having a preferred position and a secondary position, wherein the preferred position and the secondary position are connected respectively to one of the electrical power supply units; and
- a control device;
- wherein the device is suppliable with electrical power in a defined manner from each of the electrical power supply units via the switch mechanism, and wherein a switching over of the switch mechanism is controllable by the control device, and
- wherein the switch mechanism includes a power semiconductor switch.

* * * * *